DATA TRANSLATING SYSTEM HAVING A FAST SCAN ADDRESS SECTION

Filed Aug. 6, 1962

4 Sheets-Sheet 1

INVENTOR.
Evan L. Ragland, III
BY
Mueller & Aichele
Attys.

DATA TRANSLATING SYSTEM HAVING A FAST SCAN ADDRESS SECTION

INVENTOR.
Evan L. Ragland, III.
BY
Mueller & Aichele
Attys.

INVENTOR.
Evan L. Ragland, III.
BY Mueller & Aichele
Attys.

INVENTOR.
Evan L. Ragland, III.
BY
Mueller & Aichele
Attys.

United States Patent Office 3,344,239

Patented Sept. 26, 1967

3,344,239

DATA TRANSLATING SYSTEM HAVING A FAST SCAN ADDRESS SECTION

Evan L. Ragland III, Glenview, Ill., assignor to Motorola, Inc., Chicago, Ill., a corporation of Illinois Filed Aug. 6, 1962, Ser. No. 214,946
13 Claims. (Cl. 179—100.3)

The present invention relates to a data translating system, and more particularly to a system for converting an information signal of a first type to an information signal of a second type. By way of example, the system of the present invention is particularly useful for converting a binary code to an audio frequency signal for vocalization of words represented by such a code. However, the various embodiments of the disclosed system may be conveniently employed for digital to analog conversion, analog to digital conversion, or for translating either an analog or digital information signal having a given time base to a like signal of a different time base.

Many present day data translating systems receive the information signal that is to be converted, which for illustrative purposes will be considered a serialized digital code, and retain or store the received code in parallel form in a static memory device. A like indexing code is recorded on first portion of a magnetic memory drum, while a code representative of sought or converted information is recorded in a spatial relationship to the indexing code on a second portion of the drum. The code recorded on the second portion is frequently of the same general type as that recorded on the first portion and in many practical applications both are digital codes. Relative movement between the magnetic drum and two sets of pickup heads causes scanning to produce outputs indicative of both sets of codes recorded on the memory drum. The signal from the pickup means scanning the indexing code, along with the received code, are fed to inputs of a comparator circuit, which upon coincidence or parity between input signals produces a gating signal to control gating circuits associated with the pickup head reading out the sought information. To serialize or to translate the time base of the information as read out, it is then necessary to employ further static storage and complex switching and gating circuitry.

Such data translating systems, because of the complex circuitry associated with readout, and because of the fact that the indexing code and sought information recorded on the magnetic drum are scanned at the same rate, are limited in flexibility for converting received codes of one type to codes of different general types and for changing the time base of the converted code. To overcome these limitations, it is desirable to change the time base of the scan of the two types of stored codes with parity between signals from the indexing code and the received code so that the code representative of the sought information can be scanned at a different independent rate. It is also desirable that the code representative of the sought information be recorded as any chosen type, either digital or analog, independent of the type of the recorded indexing code so as it is scanned direct serial readout is achieved without further conversion.

In one aspect of the present invention, the desired change in time base of the scanning operations is accomplished by instantaneous transfer of the code representative of the sought information, recorded in the form in which it is to be utilized, to a read out device capable of independent scanning upon parity between the received code and the indexing code. This alleviates the necessity of further change in the form of the translated code, and allows change of time base and direct serial readout of the sought information.

In another aspect of the present invention, a single scanning means is employed to first scan the indexing code at a first rate, and upon parity between signals representative of this code and the received code, to subsequently scan, at a second rate, the selected code representative of the sought information. This allows direct serial readout of the selected information at a rate independent of the rate of scan of the indexing code.

It is therefore an object of the present invention to provide an improved and simplified data translating system for more flexible application than systems heretofore known.

It is another object of the present invention to provide a method for converting information signals of a first type to information signals of a second type for readout on an independent time base.

It is a further object of the present invention to provide a data translating system wherein look-up and readout of recorded data is achieved on independent time bases to provde direct serial readout of selected information in response to a received code.

It is still another object of the present invention to provide apparatus for code conversion wherein a recorded code of a first type is scanned for direct production of desired information signals in response to an independent scanning operation which selects a spatially related code of a second type.

A still further object of the present invention is the provision of a method and apparatus which enables direct serial readout on a desired time base of a code recorded in parallel in a memory storage medium so that a serial code of a first type may be converted to a serial code of a second type.

A more specific object of the present invention is the provision of a data translating system particularly suitable to function as a digital-to-voice conversion system wherein vocalized words are produced in response to a representative digital code.

A feature of the present invention is the provision of a method for data conversion wherein signals stored in the form of a photographic record on a storage medium are transferred in the form of an optical image onto a photosensitive surface in response to a received code for subsequent scanning to produce electrical signals indicative of the stored information.

Another feature of the present invention is the provision of a data translating system having a storage medium with an information field optically recorded thereon and access means to select desired information in the optically recorded field. Upon selection, an optical system directs a light pulse through the optically recorded field to project an optical image of selected information onto a photosensitive readout device for scanning to produce an electrical signal indicative of the selected information.

A further feature of the present invention is the provision of a code conversion system wherein a plurality of codes of a first type are recorded on a storage medium, and in spatial relationship thereto codes of a second type are recorded as a photographic record on said storage medium. Means are provided to scan said first type codes and compare individual ones with a received code for selection of a spatially related photographic code, and to project an optical image of said selected photographic code onto a photoconductive storage device. Independent scanning of the photoconductive storage device provides a signal indicative of said second type code.

Another feature of the present invention is the provision of means to electronically scan a plurality of codes of a first type recorded on a storage medium to select a given one of said codes, and upon selection, to electronically scan a spatially related code of a second type for direct readout so that conversion between first and second types of codes is achieved.

Still another feature of the present invention is the provision of a transparent memory storage medium with a code of a first type recorded as a photographic record on a first portion thereof, and code of a second type spatially related to said first type code recorded on a second portion thereof.

Yet another feature of the present invention is the provision of a readout device for a data translating system having a photosensitive surface to store an optical image of a projected photographic information record in the form of a charge pattern, and means to scan said charge pattern to produce an electrical signal indicative of said information.

A still further feature of the present invention is the provision of a digital-to-voice conversion system wherein a dictionary of chosen words recorded as optical sound tracks on a transparent storage medium is scanned at a first rate and selected ones of said words are projected as an optical image onto a readout device to be scanned at a second rate for vocalization of the selected word in a predetermined sequence.

Another feature of the present invention is the provision of a hydrogen strobe lamp to produce a short duration light pulse in response to a triggering signal to project, through a lens system, an optical image of information tracks photographically recorded on a storage medium onto a photosensitive readout device.

Figure 1:
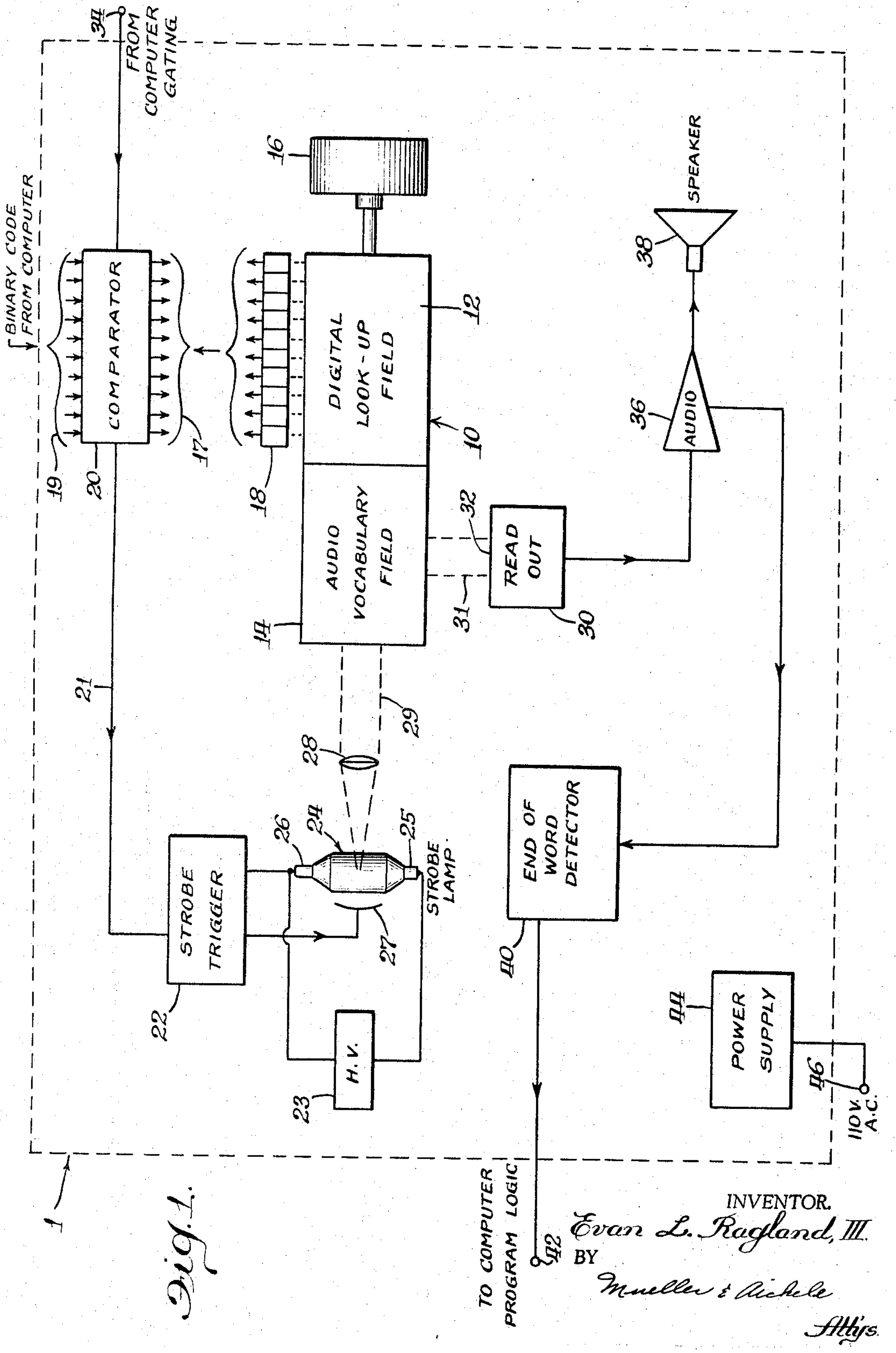
FIG. 1 is a diagram, partially in schematic and partially in block form, of a digital-to-voice conversion system incorporating the present invention.

In one form the invention provides a data translating system in which information represented by a plurality of coded signals of a first type is stored by means of photographic recordings on a first portion of a transparent storage medium, which medium may conveniently be a drum or a disc. Coded signals of a second type are recorded in spatial relationship to said first type code on a second portion of the storage medium such that selected codes of the first type are indexed by codes of the second type. The indexing codes may be recorded as photographic records in the same manner as the information codes, or they may be magnetically recorded on the storage medium in a manner conventional in the art. Pickup heads are arranged to scan the indexing code when there is relative movement between the heads and the storage medium. A light source, such as a hydrogen strobe lamp, is provided to produce a short duration light pulse when triggered from a suitable source. An optical system projects the light pulse through selected codes of the first type photographically recorded on the transparent storage medium. The image so produced is temporarily stored on a photosensitive surface of a readout device in the form of a charge pattern, and means are further provided to scan the charge pattern to produce an electrical signal indicative of information stored by the first type code.

To select desired information for readout in a given sequence, a comparator circuit is coupled to signals from the pickup heads as the second type code is scanned, while at the same time the comparator receives signals of a like nature from a remote source such as a computer. Upon coincidence between these two signals, the comparator produces an output pulse operable to trigger the strobe lamp. Because of the spatial relationship between the two types of codes recorded on the storage medium, codes of the first type are indexed for readout upon coincidence between the second type code and the code from the computer or other source during the scanning operation. It is therefore apparent that during the scan cycle an information code of the first type is transferred from storage in the form of an optical image by the light pulse, which is temporarily stored and converted to an electrical signal to provide the desired data conversion. To produce sequential conversion of a plurality of codes a control signal, initiated by the readout apparatus, is sent back to the computer to instruct its logic to send the next code of the second type to the comparator circuit.

In another embodiment of the invention, the two types of codes are recorded in spatial relationship on a storage medium capable of being scanned at different times and at independent rates by the same readout device. Such a storage medium may be a transparent mask placed over the face plate of a cathode ray tube or the target area of a photoconductive pickup tube. Information of the sought type is photographically recorded on one portion of the transparent mask, while an indexing code is photographically recorded on a second portion of the mask. This indexing code may be either digital or analog in form depending on the type of conversion desired. For example, by making the sought information audio signals either digital-to-voice or analog-to-voice conversion is possible. The electron beam of the tube is caused to scan an image provided by the transparent mask, and activation of a photoconductive surface causes photocurrent to flow to provide an electrical signal indicative of the scan. Deflection circuits, properly synchronized with switching circuits, cause the electron beam to sequentially scan the indexing code at a first rate. Upon comparison between signals so produced and received signals, the sought information is scanned at a second rate, and the output signal is switched to a utilization circuit. Thus, it is apparent that any information code of a first type can be scanned at a first rate, and converted to electrical signals of a second type for readout at a second rate.

Although the systems of the present invention may be utilized to achieve conversion of data by comparison of codes of different types or for counting spatial position as a means for determining the location of stored data, depending on the types of codes utilized and the manner in which they are recorded on the storage medium, for the purposes of illustration specific embodiments will be discussed in terms of digital-to-voice conversion. For such application, codes of one type are recorded as a plurality of optical sound tracks on the storage medium, with each sound track representative of a chosen word to form a vocabulary for the conversion system. These sound tracks are hereinafter referred to as the audio field. The code of the other type is a binary code having bits arranged to be representative of selected words in the vocabulary, and as recorded on the storage medium is hereinafter referred to as the digital or indexing field. Upon readout the electrical signals indicative of words selected from the audio field drive a loudspeaker to produce vocalization of a representative digital code received from the computer.

Functioning as a digital-to-voice converter, the flexibility and simplicity of the system of the present invention is emphasized. It is particularly important in any such application that the scan of the indexing code and the scan of the audio field or its image as transferred to the readout device be independent of one another so that rapid look-up and at the same time vocalization at a rate acceptable to audio reproduction can be concurrently achieved.

For example, in any vocabulary look-up system for audio reproduction of a sequential message in a manner which will not be objectionable to the listener, it is necessary that the time for look-up of individual words in the message be only a fraction of the time for vocalization of the word. It can be shown that the access time to select a word from a vocabulary of a given size is dependent upon the number of channels employed. However, for systems capable of employing a large (i.e., 100 words or more) vocabulary, multi-channel arrangements tend to be complex, expensive, and unreliable. In particular, the number of channels required increases progressively with the size of the vocabulary used, and necessarily creates a difficult switching problem. For a simplified system it is necessary that there be a change in time base from the time required for rapid look-up, to the relatively slow time required for intelligible vocalization. To this end, two independent scanning rates are employed by the conversion system of the present invention; one to scan the digital field so that a selected word can be searched and its image transferred to or selected by a readout device in a time period imperceptible to the listener, and the other to produce a signal representative of the image so transferred or selected having a time base compatible with audio reproduction.

In FIG. 1 of the drawings there is shown in diagrammatic form an embodiment of the digital-to-voice converter of the instant invention, as outlined by broken line 1. Transparent storage medium 10 has a plurality of digital codes and a plurality of words optically recorded on it to form digital look-up field 12 and audio vocabulary field 14. Each field may conveniently be recorded on the storage device 10 in a variable density or variable area manner as is conventional, for example, for recording sound tracks on motion picture film. Spatial relationship between each digital indexing code and recorded audio words is such that selection of a digital code results in proper selection of a desired word. In the system of FIG. 1 (further illustrated in mechanical form in FIG. 2) storage device 10 may be a hollow, cylindrical drum of a transparent material such as glass, adapted to be rotated at a constant speed by synchronous motor 16.

As storage device 10 is rotated, pickup means 18 scans digital field 12, which on a drum of the type described may include a plurality of 10-bit binary codes recorded about its periphery. A binary code of this type represents 1024 possible permutations, and accordingly a like number of words can be stored in vocabulary field 14. A beam of light from a continuously glowing incandescent lamp (FIG. 2) projects an optical image of the digital code onto photosensitive pickup means 18. The pickup means includes a plurality of semiconductor PN junctions, one for each information bit, and couples a signal representative of the digital code directly to input 17 of comparator 20. To restrict the light field produced by the incandescent lamp to a single code recorded in the digital field, an aperture or light shield (FIG. 2) may be provided, or the light beam projected through the digital field may be compressed by a conventional condensing lens system. It is to be further understood that digital field 12 may also be magnetically recorded on storage medium 10, in which case pickup means 18 may consist of a plurality of magnetic pickup devices.

A like digital code is fed into a second input 19 of comparator 20 from a remote computer. Comparator 20 is of the type commonly used in digital techniques, and when gated with a signal coupled to control terminal 34, as hereinafter described, produces an output signal on lead 21 whenever there is parity between the binary signals fed into inputs 17 and 19.

Strobe trigger circuit 22, triggered by the output signal of comparator 20, initiates discharge of a high voltage energy pulse from high voltage supply 23 through strobe lamp 24. High voltage supply 23 and trigger circuit 22 are of the type commonly utilized to cause arc or plasma discharge. Supply 23, for example, may include a high voltage energy storage capacitor connected between anode terminal 25 and cathode terminal 26 of strobe lamp 24, and rectifier means to change the capacitor to a predetermined value between discharge pulses. Strobe trigger circuit 22 includes a low voltage storage capacitor, changed from a suitable source, and arranged to be discharged through the primary of a triggering transformer by a device such as a thyratron or a controlled silicon rectifier upon receiving a pulse from the output of comparator 20 on lead 21. The triggering pulse so produced is coupled between trigger electrode 27 and cathode electrode 26 of strobe lamp 24 to initiate discharge of the high voltage energy storage capacitor, producing a high intensity, short duration light pulse. By way of example, available hydrogen strobe lamps such as G.E. type FT–230 produce a light pulse of 2–4 microseconds duration when operated from a 2000 volt energy supply.

Lens 28 collimates the light pulse originating from the point source of strobe lamp 24 into a parallel beam of light 29, which is directed into the transparent drum of storage medium 10. The light beam is reflected by a mirror (FIG. 2) and is directed through audio vocabulary field 14. Details of a preferred optical system for directing the light pulse through the audio field are fully set forth in Patent No. 3,229,047, Jan. 11, 1966, of A. R. Simpson, commonly assigned. It is to be further understood that the storage medium may be a disc rather than a drum, and corresponding modifications of the optical system may be made for directing the light pulse through the optical field recorded thereon.

Light column 31, as directed through audio field 14 by the mirror and optical system located in storage device 10, projects an optical image of a word photographically recorded in audio field 14 onto photosensitive surface 32 of readout device 30. The incident optical image in turn produces a conductive image in the form of a charge pattern on surface 32 to provide an electrostatic reproduction of a word strobed from the audio field. Readout device 30 may be a photoconductive pickup tube, commonly known as a Vidicon, which stores an electrostatic image until scanned by an electron beam, in the manner disclosed in copending application Ser. No. 215,059, filed Aug. 6, 1962, by A. R. Simpson, commonly assigned, or it may be a moving electrostatically charged belt, drum, or disc cooperating with an electrostatic pickup device, as hereinafter described.

Audio amplifier 36 amplifies the electrical signal produced by readout device 30 upon scan of the image stored on photoconductive surface 32. This signal drives speaker 38 to provide a vocalization of the word selected from the vocabulary stored in audio field 14. A portion of this signal is also fed to end-of-word detector 40. This detector includes rectifier and filter circuitry to provide at terminal 42 a direct current voltage in response to the signal produced by readout device 30 and amplified by amplifier 36. Alternately end-of-word detector 40 may be activated by a tone of a selected frequency or coded pulses associated with each optically recorded word to provide a control voltage in response thereto. This voltage is coupled back to the program logic of the computer so that in its absence, indicative of the end of vocalization of a selected word, the computer can supply a gating signal to control terminal 34 of comparator 20. This gating action allows the next binary code in a sequential message supplied from the computer to be compared with signals scanned from digital field 12.

Power supply 44, energized from a convenient 110 volt, 60 cycle or 400 cycle source connected at terminal 46 provides the necessary AC and DC voltages for operation of individual circuits of the data translating system. As can be readily seen, the system outlined by broken line 1 is self-contained, requiring a minimum of external connections.

To understand operation of the system, assume that a binary code has been received at input 19 and an operating gating voltage has been supplied to input 34 of comparator 20 from a remote computer. Typically such a code may consist of one of the 1024 ten-bit word addresses recorded on digital look-up field 12. As storage device 10 rotates digital field 12 is scanned by pickup means 18, and parity between signals supplied to inputs 17 and 19 of comparator 20 is achieved sometime during a complete revolution. This produces an output voltage on lead 21 to initiate strobe trigger 22, causing a short duration light pulse to be produced by strobe lamp 24. This pulse of light is directed through the audio vocabulary field portion 14 of storage device 10 to emerge as light beam 31. A selected variable density or variable area word recording, properly indexed to be spatially aligned in the path of the light beam when parity is achieved, is optically projected onto photosensitive surface 32 of readout device 30. This provides an electrostatic reproduction of the optically recorded word on surface 32. The electrostatic image is then independently scanned by the readout device to produce an audio frequency signal which is used to drive speaker 38, resulting in a vocalization of the stored audio word. With vocalization, end-of-word detector 40 supplies a voltage to the program logic of the computer, which in turn supplies a signal to gate comparator 20 so that the process may be repeated for a subsequent word in the message. Vocalization is produced at a rate established by the rate of scan of the readout device, such a rate being selected to be compatible with audio reproduction. The rate of scan of the digital field, and thus the look-up time of stored audio words, is established by rotation of the storage medium. Thus, the look-up time is independent of the rate of vocalization, and can be made sufficiently high to be imperceptible to the listener so that there are no distracting interruptions during vocalization of a sequential message.

Figure 2:
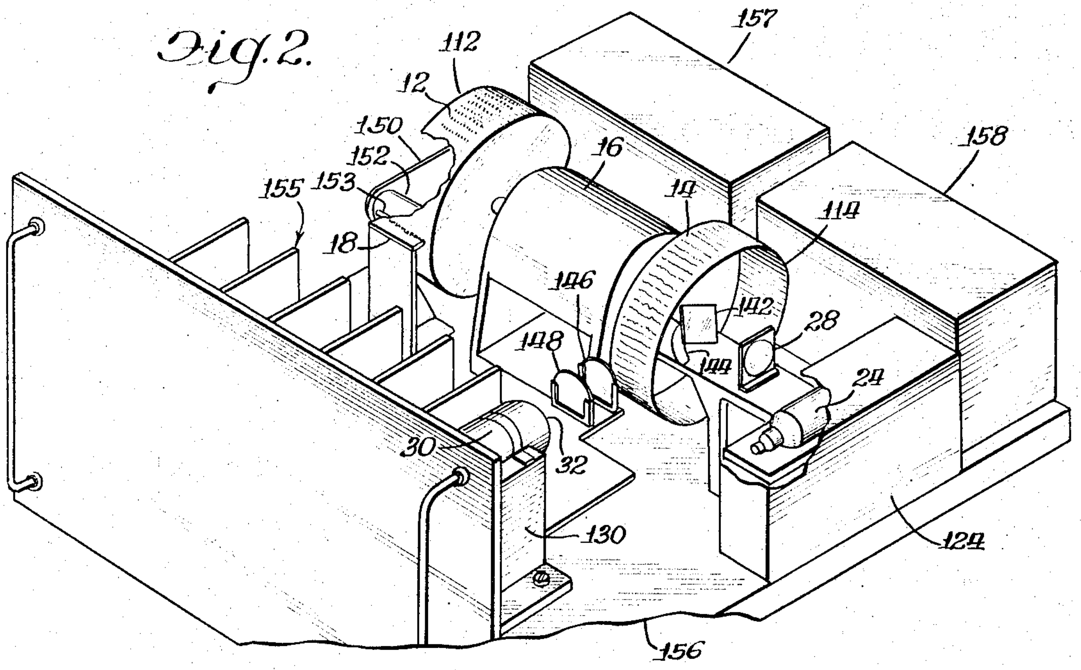
FIG. 2 is a perspective drawing of a mechanical embodiment of the system of FIG. 1.

FIG. 2 shows in mechanical form the digital-to-voice converter of the present invention mounted on a single chassis. Transparent storage device 10 comprised of two cylindrical drums 112 and 114, one for digital field 12 and one for audio vocabulary field 14. Each cylindrical drum is located on opposite ends of motor 16 for ease of balancing, to be driven at a rate of 3600 r.p.m.

In recording the optical fields on the drums, use is made of a standard 16 mm. optical sound recording of voiced words, and the sound track image is reduced by a factor of 14.8 to obtain a one second word capability within the field of standard optical projection systems. This factor reduces the 7.2 inch one second field of the 16 mm. film to 1.5 inches, a dimension which satisfies the resolution capabilities of photographic emulsions and also permits the use of standard 35 mm. optical components for photographing of the image. The sound track width may, in addition, be compressed so that a 1024 word vocabulary may be recorded around the periphery of drum having a 6 inch diameter. A digital field, each bit having the same height as the audio word, and with a 0.0625 inch spacing between each bit, can conveniently be recorded on drum 112 of the same approximate size. Thus, it is possible to record a 1024 word vacabulary field and a digital indexing field on two drum portions, each 6 inches in diameter and 1.5 inches wide. Although typical, these dimensions are not limiting, and systems employing other optical dimensions and drum sizes may also be employed to produce the same results.

Strobe lamp 24, suitably mounted in housing 124, provides a light pulse which is emitted through an aperture in housing 124 and is directed into the interior of drum portion 114 by collimating lens 28. Lens 28 collimates the small spherical light source produced by strobe lamp 24 to create a parallel beam of light to be deflected at right angles by mirror 142. Cylindrical condensing lens 144, located at slightly less than its focal length from the optical recording of words in audio field 14, vertically compresses the reflected light beam to project it through an aperture (not shown) located opposite a selected audio word. The image of this audio word is directed through a condensing prism 146 and objective lens 148 to be projected onto photosensitive surface 32 of readout device 30 for temporary storage and audio scanning. In the embodiment shown, readout device 30 man conveniently be a photoconductive pickup tube functioning in a manner fully set forth in copending application previously mentioned, and located externally to drum portion 114 by mounting assembly 130.

An incandescent light source for digital look-up field 12 is secured in drum portion 112 by bracket 150 and suitably shielded by housing 152. Aperture 153 directs a beam of light through that portion of digital field 12 directly opposite pickup means 18 mounted externally to drum portion 112. If desired, a condensing lens system (not shown) may be employed to direct the light through the digital field and onto photosensitive head 18. This head comprises a plurality of PN photosensitive pickup devices axially disposed along digital field 12 having one such device for each bit of the field. The output of pickup means 18 is fed to comparator 20 which may conveniently employ semiconductor circuitry mounted on printed circuit boards 155, adapted to be secured on chassis portion 156. Housings 157 and 158 include the strobe lamp trigger circuit and power supply, and the photoconductive pickup tube power supply and sweep circuit respectively. Other circuitry for the system is preferably transistorized and may be mounted on printed circuit boards 155 secured to chassis 156.

Drum portions 112 and 114 are rotated continuously at 3600 r.p.m. by motor 16. Since the time for one complete revolution is 16.7 milliseconds, the maximum look-up time for the 1024 vocabularly stored on the drum is also 16.7 milliseconds. Listening tests indicate that word spacings of less than 50 milliseconds are not noticeable to the listener. The time required to transfer the optical image from the audio vocabulary field to the photoconductive surface of the readout device is less than 4 microseconds. Therefore, the total sequence of look-up and transfer of a selected audio word is less than the time required to be perceptible by the listener, and a sequential message may be vocalized without any objectionable pauses between words.

Figure 3:
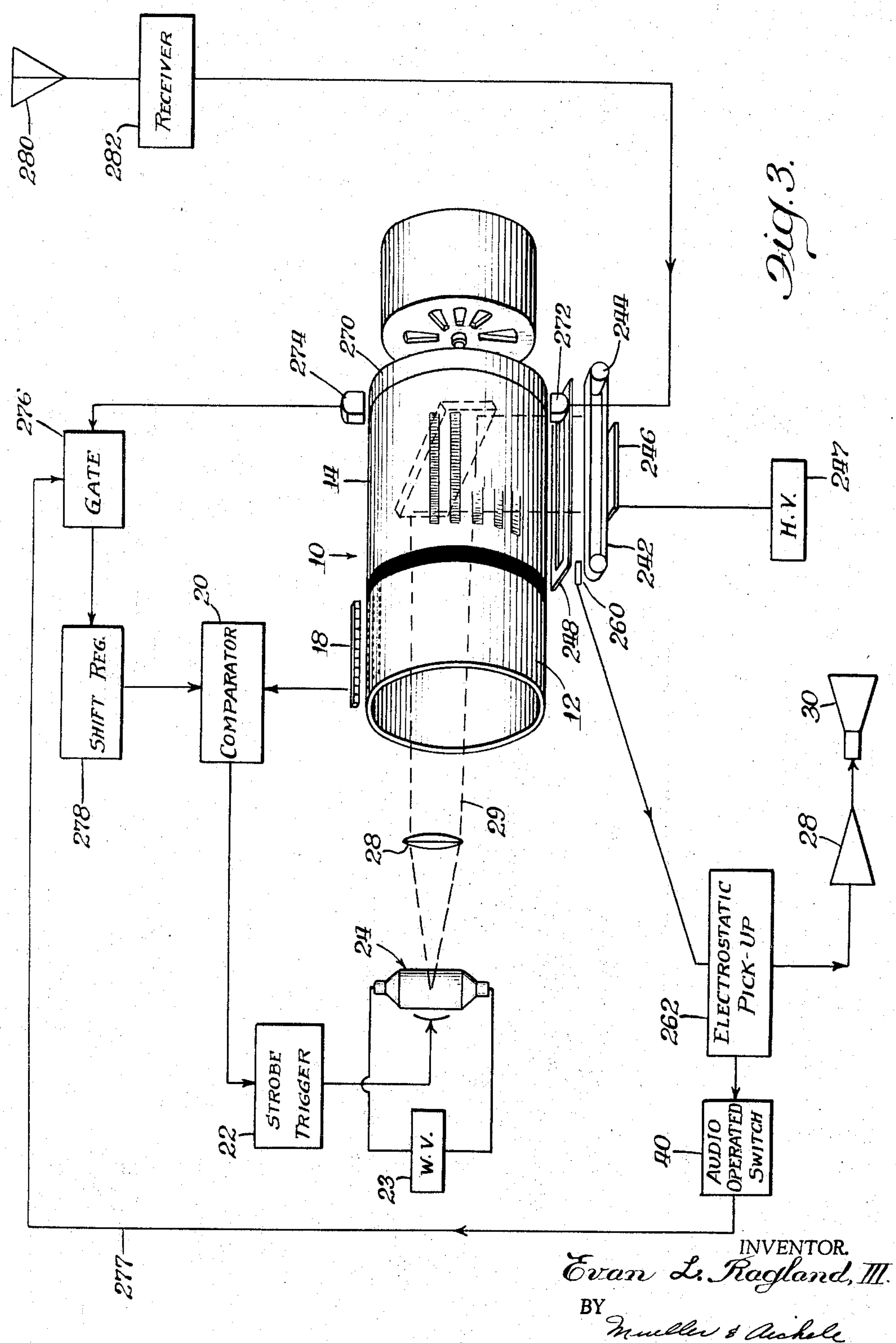
FIG. 3 is a ciruit diagram illustrating another embodiment of the present invention.

FIG. 3 shows an embodiment of the present invention wherein readout is accomplished by transfering the stored optical word onto the surface of a moving memory photoconductive element to thereby provide a moving electrostatic image of the word. Moving belt 242, coated with an electrostatically charged photoconductive material, is positioned immediately adjacent the portion of the drum 10 whereon audio field 14 is recorded. The coatings may be, for example, deposited amorphous selenium as it is used in standard xerographic processes. The belt is caused to move at a speed compatible with audio reproduction by rollers 244 driven in a suitable manner, and is charged by plate 246, connected to a high voltage supply 247. Strobe lamp 24 is triggered by the output of comparator 20 to project a light beam into drum 10. The light pulse is collimated by lens 28 and light beam 29 is directed into drum 10, while a lens and mirror system of the type shown in FIG. 2 directs the light beam through a selected recording in an audio field 14. An incandescent lamp may be inserted in transparent drum 10 to project an image of digital field 12 onto pickup devices 18 in the same manner discussed in conjunction with FIGS. 1 and 2.

The light pulse projected through audio field 14 creates an electrostatic image on changed belt 242. Shield 248 masks the projected image so that there is an electrostatic discharge of the charged photoconductive material, proportional to the intensity of incident light, only in the immediate vicinity of the incidence of the strobe light pulse. The electrostatic image of the word so produced is detected by electrostatic probe 260, and converted to an audio signal by electrostatic pickup 262. Shown diagrammatically in the drawing, this probe and pickup arrangement includes a shielded conductive plate 260 disposed next to the charge pattern on belt 242 such that a signal is produced by electrostatic induction as the variable charge pattern is moved past the conductive plate. This signal is then amplified by amplifier 28 to drive speaker 30.

Also shown in FIG. 3 is a magnetic memory track 270 disposed around the periphery of one end of drum 10. A digital code, telemetered from a remote point, is received via antenna 280 and receiver 282 and recorded on memory track 270 by write head 272. This code is sequentially read by read head 274 and fed through gate 276 to shift register 278 to be supplied to comparator 20. Parity between the code held in parallel in shift register 278, as supplied to comparator 20, and the indexing code read by pickup devices 18 produce a signal to trigger strobe lamp 24, and the selected audio word from the audio field is transferred to the photosensitive surface of the readout device for scanning and vocalization in the manner previously described.

In the embodiment of FIG. 3, a digital message of approximately 100 words can be received and serially recorded on magnetic memory band 270. In addition to digital word addresses, each digital word also includes digital sequential information bits to allow transfer to shift register 278 in proper sequence. When the signal from end-of-word detector 40, supplied on lead 277, opens gate 276 the next word in coded sequence is transferred to be held in shaft register 278 for comparison with the indexing code scanned from digital field 12. The functions of shift register 278 and gate 276 are similar to those preformed by equivalent circuits in the remote computer in the embodiment of FIG. 1. However, with the system of FIG. 3 it is possible to telemeter an entire sequential message to the remotely located conversion system and vocalize the message without feedback to the computer logic to provide the gating for sequential vocalization of a received message.

Figure 4:
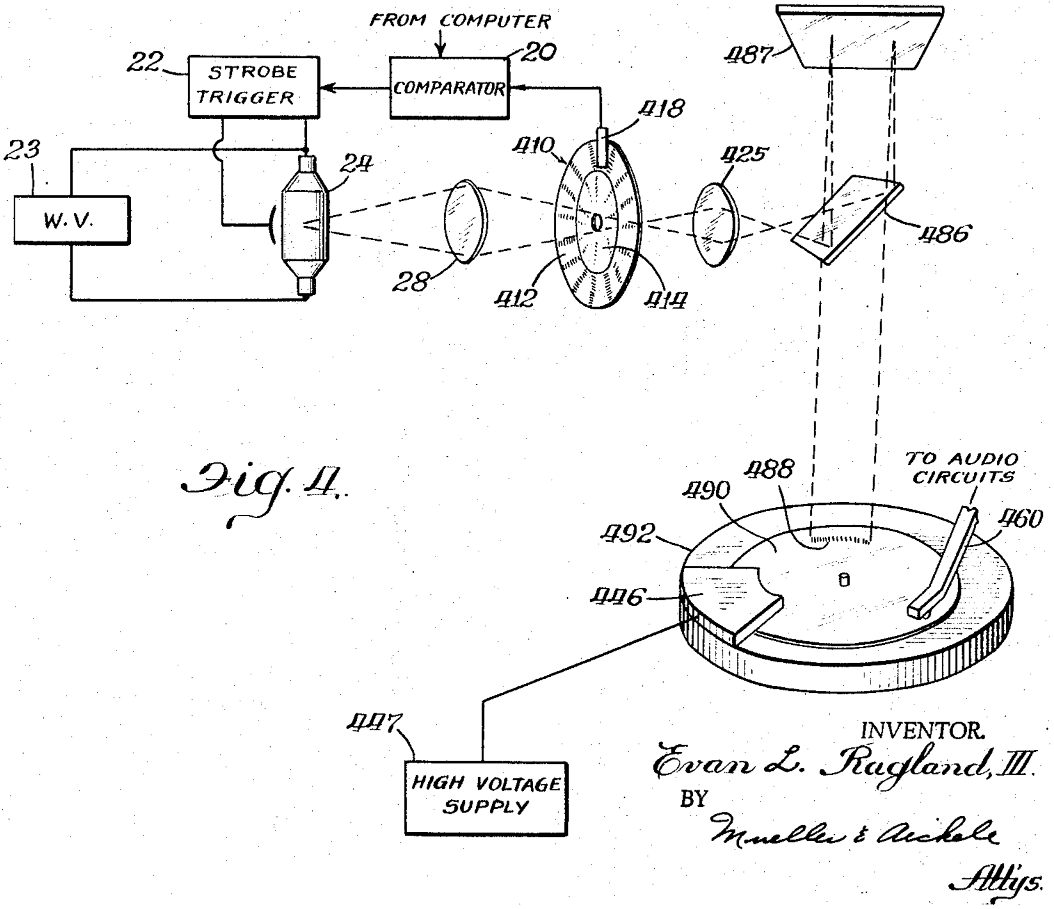
FIG. 4 is a diagram of a modification of the system of FIG. 1.

An embodiment of the conversion system of the present invention utilizing a rotating disc as the storage medium is diagrammatically illustrated in FIG. 4, wherein like reference numerals refer to like elements functioning in the same manner as in FIG. 1. Transparent storage disc 410 has audio field 414 and digital field 412 recorded thereon in the radially extending manner shown. Disc 410 is mounted on a shaft (not shown) and caused to rotate so that digital field 412 is scanned by pickup head 418. The digital signals so produced are coupled to comparator 20 for parity with signals received from a remote computer to trigger strobe lamp 24, thereby projecting a light pulse through selected words photographically recorded in audio field 414 in the manner previously discussed. An optical system, including lens 425 and mirrors 486 and 487, projects an optical image of the selected word onto charged photoconductive surface 490 of a disc record on turntable 492 to form change pattern image 488. As the disc record is rotated by turntable 492, change pattern 488 is scanned by electrostatic pickup head 460 to produce electrical signals for connection to audio circuits to cause vocalization of the word represented by image 488. Subsequent to scanning, surface 490 is recharged by charge plate 446, connected to high voltage power supply 447. Independent rotation of transparent disc 410 and turntable 492 produce independent scan rates of the digital field and of the projected word image so that the desired change in time base is accomplished.

Figures 5, 6, 7:
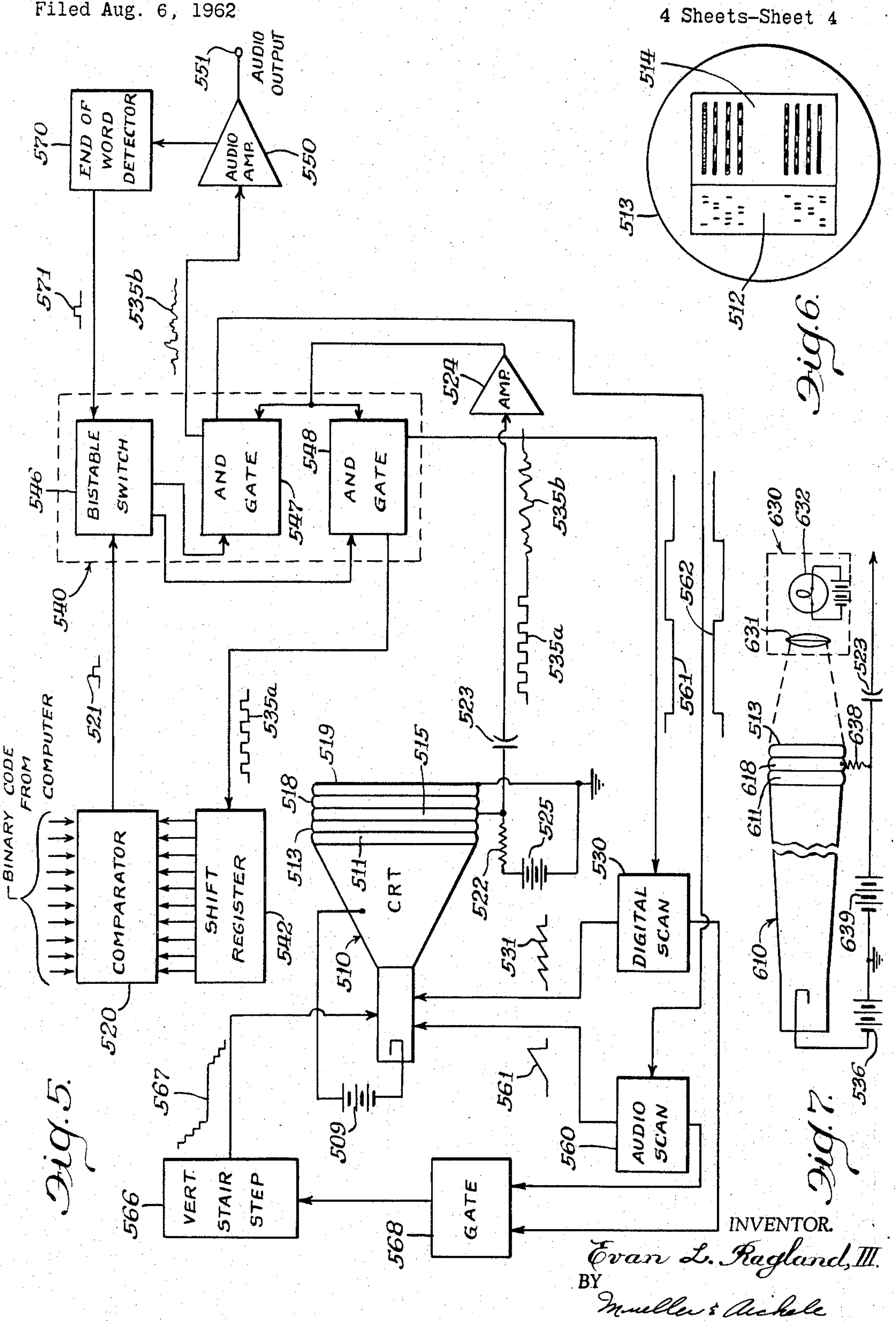
FIG. 5 is a block diagram of a further embodiment of the data conversion system of the present invention.
FIG. 6 shows the transparent mask used with the embodiment of FIG. 5.
FIG. 7 shows a modification of the data conversion system of FIG. 5.

In addition to use of a rotating transparent storage medium to provide the desired time base change for data conversion such as digital-to-voice conversion, a cathode ray tube storage device may be utilized as shown in FIGS. 5 and 6. In these figures cathode ray tube 510, having a standard phosphorous face plate 511, is provided with a transparent mask 513. As illustrated in FIG. 6, mask 513 of transparent material has digital field 512 and audio field 514 recorded thereon in spatial relationship. The digital and audio fields may conveniently be variable density or variable area photographic recordings of the type previously discussed. Also provided is a layer of photoconductive material 518 placed between electrodes 515 and 519, in physical contact with mask 513. Electrode 515 is of transparent material such as conductive glass and is connected to a signal supply potential 525 so that current can flow through a series circuit consisting of the photoconductor 518, electrode 515 and signal resistor 552. As the electron beam of the cathode ray tube scans face plate 511 it causes local illumination of the phosphorous coating. This illumination, projected through mask 513, changes the conductivity of photoconductive layer 518, resulting in photocurrent flow between electrodes 515 and 519. This photocurrent varies the voltage across resistor 522 which, when coupled through capacitor 523 to amplifier 524, produces an output signal indicative of the change in conductivity. Thus, as the electron beam of cathode ray tube 510 scans face plate 511 horizontally, the digital and audio fields photographically recorded on mask 513 are translated into electrical signals, as represented by waveforms **535*a* and 535*b*. A suitable potential supply 509 is connected between the cathode of cathode ray tube 510** and its envelope coating in the conventional manner.

A digital-to-voice conversion system employing a cathode ray tube as an information storage device is shown in FIG. 5. The output of horizontal digital scan generator 530, providing a sawtooth waveform 531, is applied to the horizontal deflection plate of cathode ray tube 510. This causes the electron beam to scan digital field 512 horizontally. The output signals from the digital scan, represented by waveforms **535*a*, are coupled through capacitor 523 and amplifier 524 to digital-to-voice switch 540. When activated in the manner hereinafter described, digital-to-voice switch 540 allows pulses 535*a*, representative of the digital field, to enter shift register 542. This serial digital code is temporarily stored in parallel by shift register 542 and compared in comparator 520 with a like code received from a remote source such as a computer. Upon parity between inputs from shift register 542 and the computer, comparator 520 produces an output pulse 521**.

Digital-to-voice switch 540 includes bistable switch 546, AND gate 547, and AND gate 548. Bistable switch 546 provides an enabling signal or voltage of a predetermined level to one input of either AND gate 547 or AND gate 548. A second input to AND gates 547 and 548 is provided by the output of amplifier 524. When AND gate 548 is enabled, the digital code is coupled from amplifier 524 to shift register 542 and compared in comparator 520 with a like code from the computer in the manner previously discussed. Parity pulse 521 reverses the state of bistable switch 546 to thereby disable AND gate 548 and to enable AND gate 547. This allows audio signal portion **535*b* of the output of amplifier 524 to be coupled through AND gate 547 to audio amplifier 550. Vocalization of this signal is provided by a suitable transducer device such as a loudspeaker coupled to audio output terminal 551**.

To provide for synchronization between the scan of the digital and audio fields by cathode ray tube 510 and switching between shift register 542 and audio amplifier 550 by digital-to-voice switch 540, digital-to-voice switch 540 also produces output signals 561 and 562.

These signals are responsive to the state of bistable switch 546 and function to allow either horizontal digital scan generator 530 or horizontal audio scan generator 560 provide the sweep for the cathode ray tube 510. When AND gate 548 is enabled scan generator 530 is activated and scan generator 560 is de-activated so that sawtooth signal 531 provides a scan of digital field 512 only. When parity signal 521 enables AND gate 547 so that the output of amplifier 524 is coupled to audio amplifier 550, scan generator 530 is deenergized and scan generator 560 is energized so that sawtooth signal 561 is coupled to the horizontal deflection plates of cathode ray tube 510. This provides a single sawtooth sweep of a magnitude which allows only audio field 514 to be scanned.

Vertical stair-step generator 566 provides a step signal 567 to the vertical deflection plates of cathode ray tube 510. These steps coincide with sawtooth signal 531 so that each line of digital field 512 is sequentially scanned at a rapid rate. With parity between inputs to comparator 520, vertical stair-step generator 566 is temporarily disabled so that a single scan may be made of the selected audio word in audio field 514. To this end the signal activating either scan generator 530 or scan generator 560 is further fed to gate 568. When horizontal digital scan generator 530 causes scan of digital field 512, the output of gate 568 energizes vertical stair-step generator 566 to allow stepped vertical deflection of the cathode tube beam. When horizontal audio scan generator 560 is activated to scan audio field 514, gate 568 provides a signal to vertical stair step generator 566 to hold the vertical deflection at a selected level, thus allowing a single scan of the selected audio word.

At the end of vocalization of selected word, end-of-word detector 570, which may be an audio activated switch coupled to audio amplifier 550, provides output signal 571 to bistable switch 546. This switches digital-to-voice switch 540 back to its original state and allows digital signals 535*a* to be coupled to shift register 542.

The various waveforms illustrated in FIG. 5 are not drawn to scale but are merly representative to enhance understanding of the operation of the system therein shown. To provide the required change in time base between digital scan and audio readout, horizontal sweep sawtooth 531, synchronized with vertical stair-step wave 567, occurs at a rate that enables scan of the entire digital field 512 in a fraction of a second, while horizontal sweep 561 causes scan of a selected audio word in the order of one second to provide adequate vocalization. Thus, the repetition rate of sawtooth 531 is such that the entire digital field 512 is scanned in a very short time period with respect to the period of scan of a single line of audio field 514, as determined by sawtooth 561. In addition, the reference levels of both sawtooth 531 and 561 are displaced by an amount which allows scanning only of desired portions of mask 513. From the above description it is apparent that the system of FIG. 5 provides switching and synchronization to allow rapid sequential scan of the digital field at a first rate and a slow scan of a selected word in the audio field at a second rate to provide the desired serial readout of a selected word. It is to be further understood that the data translating system of FIG. 5 may be used for other data conversion applications than digital-to-voice conversion and that other types of information fields others than those described may be recorded on mask 513.

In a modification of the system embodied in FIG. 5, it is possible to substitute a photoconductive pickup tube of the type known as a Vidicon for cathode ray tube 510, as shown in FIG. 7. To this end photoconductive pickup tube 610, including photoconductive target area 611, is provided with transparent electrode 618 and mask 513. This combination is illuminated from a light source 630, which may conveniently include an incandescent bulb 632 and objective lens 631. Cathode potential is supplied by source 536, and a signal voltage is developed by across resistor 638, series connected between signal supply 639 and electrode 618. Photoconductive surface 611 retains a charge pattern of a density corresponding to the digital and audio fields recorded on mask 513, and when scanned by an electron beam electron flow from the beam varies in proportion to this charge pattern. Signals corresponding to waveforms 535*a* and 535*b* are developed across resistor 638 and are coupled by capacitor 523 to amplifier 524 as in the system of FIG. 5, and the switching and scanning functions are performed in the same manner to provide the desired data conversion.

The invention provides therefore a simple yet versatile data translating system to convert an information signal of a first type to an information signal of a second type. Although as described the various embodiments of the present invention are particularly useful for digital-to-voice conversion, other types of data conversion may be readily achieved. The various embodiments of the invention shown provides means to scan stored information signals at a first rate and upon selection of a desired signal means to cause scan and readout at a second rate. Thus, there is conversion between different types of data having different time bases and there is direct serial readout of the selected data. The various embodiments shown are simple, flexible and compact and may be readily used with existing computer installations or data processing centers without substantial modification.

What is claimed is:

1. In a data translating system for producing readout of data signals of a first type in response to received data signals of a second type, the combination including a storage medium having data signals of said first and second types recorded thereon in spatial relationship, with said first type data signals recorded as an optical record, access means operable to scan said second type data recording at a first rate to reproduce said second type data signals in response thereto, means coupled to said access means to compare said reproduced second type data signals with the received data signals of said second type, said comparing means being operable to produce an output signal upon coincidence of said compared signals, a pulse light source, means coupling said comparing means to said light source and responsive to said output signal to produce a light pulse from said light source, readout means, an optical system for projecting said light pulse through said optical record to produce an image of said first type data signals recorded therein at said readout means, said readout means acting to temporarily store and scan said image at a second rate to produce electrical signals in response thereto, so that scanning said second type signals recorded on said storage medium at said first rate produces selection and transfer of said recording of said first type signals to said readout device, whereby said transferred recordings are scanned at said second rate independently of said first scanning rate to provide readout of data signals of said first type.

2. The data translating system of claim 1 wherein said access means provides a first rate of scan such that the time period for one complete scan cycle of said second type data recorded on said storage medium is a negligible percentage of the time base of said first type data signal established by said second rate of scan, so that selection and transfer of the recording of said first type data to said readout device is imperceptible during sequential readout of data signals of said first type.

3. The data translating system of claim 1 wherein said readout means includes an electrostatically charged photoconductive surface to store said image in the form of a charge density pattern, electrostatic pickup means, means to move said surface relative to said pickup means so that said pickup means produces data signals of said first type, and means to recharge said surface subsequent to readout of the image stored thereon by said pickup means.

4. A digital to voice conversion system including in combination, a transparent storage medium having an audio field recorded on a first portion thereof, said audio field including a plurality of optical sound tracks each representative of a selected word of a chosen vocabulary, a digital field recorded on a second portion of said storage medium, said digital field including a plurality of binary representations of said words spatially related to corresponding words in said audio field, pickup means to provide signals corresponding to the binary representations in said digital field, means to produce relative movement between said storage medium and said pickup means to cause scanning of said digital field by said pickup means at a first rate, means coupled to said pickup means to compare a like digital code with said signals from said pickup means as said digital field is scanned, with said comparing means operable to produce an output signal upon coincidence between said compared signals, means coupled to said comparing means responsive to said output signal to produce a light pulse, optical means to project said light pulse through said audio field to produce an image of said optical sound tracks recorded therein, means responsive to said image to temporarily store the same in the form of a charge density pattern, means to scan said charge pattern at a second rate independent of said first rate to produce audio frequency signals in response thereto, and means coupled to said scanning means to produce vocalization of said audio frequency signals, so that said received code is compared with signals scanned from said digital field to cause spatially related words in said audio field to be optically transferred to said temporary storage means to be independently scanned to provide vocalization of words represented by said code.

5. The combination of claim 4 wherein said storage medium comprises a transparent cylinder having said field recorded around the periphery thereof, with the recording axis of each said field parallel to the longitudinal axis of said cylinder.

6. The combination of claim 4 wherein said transparent storage medium comprises a flat circular disc having said fields radially disposed on one major surface thereof such that each individual photographic sound track and its representative binary code extend radially from the center of said disc.

7. A digital to voice conversion system to produce sequential vocalization of selected words in response to a digital code received from the logic circuitry of a computer, the combination including a transparent storage medium having an audio field recorded on a first portion thereof, said audio field including a plurality of photographic sound tracks each representative of a selected word of a chosen vocabulary, a digital field recorded on a second portion of said storage medium, said digital field including a plurality of binary representations of said words spatially related to corresponding words in said audio field, pickup means to provide signals indicative of said binary representations in said digital field, means to produce relative movement between said pickup means and said storage medium to cause scanning of said digital field by said pickup means at first rate, gate means to sequentially receive digital codes representative of given words from said computer, with each received code representative of a given word in a sequential message to be vocalized, means coupled to said pickup means and said gate means to compare said received code with signals from said pickup means as said digital field is scanned, said comparing means operable to produce an output signal with coincidence between said compared signals, means coupled to said comparing means and responsive to said output signal to produce a light pulse, optical means to project said light pulse through said audio field to produce an optical image of a photographic sound track recorded in spatial relationship to said binary representation producing signals coincident with said received digital code, means to temporarily store said image in the form of a charge density pattern, means to scan said charge pattern at a second rate independent of said first rate to produce an audio frequency signal in response thereto, first means coupled to said scanning means responsive to said audio frequency signal to produce audible output, second means coupled to said scanning means and responsive to said audio frequency signal to provide a gating signal, and means coupling said gating signal to said gated receiving means to enable said comparator means to receive the next sequential digital code from said computer, so that said received codes are sequentially compared with signals scanned from said digital field to optically transfer spatially related words into said audio field to said temporary storage means to thereby produce sequential vocalization of words represented by said digital codes.

8. In a digital to voice conversion system, the combination including a cathode ray tube, a transparent storage medium disposed next to the face plate of said cathode ray tube, said storage medium having a first portion with a plurality of optical sound tracks recorded thereon and a second portion with a plurality of binary codes recorded thereon, means including a photoconductive surface and a pair of electrodes disposed next to said transparent storage medium to produce signals indicative of data recorded thereon in response to incidence of the electron beam of said cathode ray tube on said face plate, first deflection means to cause said electron beam to scan the portion of said face plate disposed next to the record of said binary codes, comparator means, means coupling signals indicative of said binary representations to said comparator means, with said comparator means operable to produce an output signal in response to coincidence between said binary representations and a reference signal, second deflection means to cause said electron beam to scan the portion of said face plate disposed next to the record of said sound tracks, switching means coupled with said comparator means, with said switching means responsive to said output signal to initiate deflection of said electron beam by said second deflection means, and means coupling the signals provided by the scan produced by said second deflection means to audio reproduction means to produce vocalization of words recorded in said optical sound tracks.

9. In a data translating system for producing readout of data signals of a first type in response to received data signals of a second type, the combination including an electron tube having a photoconductive surface and providing an electron beam for scanning said surface, a transparent storage medium having data of said first and second types recorded thereon in a predetermined spatial relationship for producing a corresponding charge pattern on said photoconductive surface, means to produce signals representative of said recorded data in response to incidence of said electron beam on said photoconductive surface, means to cause said electron beam to scan the portion of said photoconductive surface having a charge pattern corresponding to said second type data to provide signals representative of said second type recorded data in response thereto, means to compare said signals representative of said recorded second type data with said received data signals, said comparing means producing an output signal upon coincidence of said compared signals, and means responsive to the output of said comparing means to cause said electron beam to scan the portion of said photoconductive surface having a charge pattern corresponding to said first type data to provide signals in response thereto.

10. A code conversion system for translating a received code of a first type to a corresesopnding code of a second type, said system including in combination, an electron tube having a photoconductive surface and providing an electron beam for scanning said surface, a transparent storage medium having codes of said first and second types recorded thereon in a predetermined spatial relationship for producing a corresponding charge pattern on said photoconductive surface, transparent electrode means positioned between said photoconductive surface and said transparent storage medium, circuit means connected to said electrode for producing signals indicative of said recorded data in response to incidence of the electron beam on said photoconductive surface, first deflection circuit means to cause said electron beam to scan the portion of said photoconductive surface having a charge pattern corresponding to said first type code to provide signals representative of said first type code in response thereto, means to compare said signals representative of said first type code with the received code signal, with said comparing means producing an output signal upon coincidence of said compared signals, second deflection circuit means to cause said electron beam to scan the portion of said photoconductive surface having a charge pattern corresponding to said second type code to provide signals representative of said second type code in response thereto, switching circuit means responsive to said output signal, with said switching means operable to deactivate said first deflection circuit means and to activate said second deflection circuit means, whereby said first type code is scanned to select a spatially related code of said second type, and said second type code is subsequently scanned for readout.

11. A digital to voice conversion system to produce sequential vocalization of selected words in response to a digital code received from the logic circuitry of a computer, the combination including a cylindrical transparent storage medium having an audio field recorded in a first portion thereof, said audio field including a plurality of photographic sound tracks each representative of a selected word of a chosen vocabulary, with the recording axis of each of said sound tracks being parallel to the longitudinal axis of said cylinder, a digital field recorded on a second portion of said storage medium, said digital field including a plurality of binary representations of said words spatially related to corresponding words in said audio field, with the recording axis of the digital field parallel to the recording axis of the audio field, a magnetic portion on said storage medium to provide a serial recording of a received digital code, means to receive a digital code from a remote source, means coupled to said receiving means to record said received code on said magnetic portion, first pickup means to provide received code signals indicative of said received code recorded on said magnetic portion, second pickup means to provide digital field signals indicative of said binary representations recorded in said digital field, means to produce relative movement between said storage medium and said first and second pickup means to cause scanning of said digital field and of said magnetically recorded code by said first and second pickup means at a first rate, means gated to sequentially transfer the signals provided by said first pickup means to static storage means, said storage device translating said serially received code signals to parallel received code signals, comparator means having a first input coupled to said second pickup means and a second input coupled to said static storage means, said comparator means operable to produce an output signal with coincidence between said parallel received code signals and said digital field signals, means responsive to said output signal to produce a light pulse, optical means to project said light pulse through said audio field to produce an optical image of a photographic sound track recorded in spatial relationship to said binary representation, means to temporarily store said image in the form of a charged density pattern, means to scan said charge pattern at a second rate independent of said first rate to produce an audio frequency signal in response thereto, first means coupled to said scanning means and responsive to said audio frequency signal to produce an audible output, second means coupled to said scanning means and responsive to said audio frequency signal to provide a gating signal, and means coupling said gating signal to said gating means to enable said static storage means to receive the next sequential series of digital signals from said magnetic portion, whereby received signals are sequentially compared with signals scanned from said digital field to optically transfer spatially related words in said audio field to said temporary storage means to thereby produce sequential vocalization of words represented by said received code.

12. Apparatus for retrieving from storage any of a plurality of prerecorded data elements, comprising, a storage medium on which each element of data is recorded in both an audible frequency form and in a coded form adjacent thereto, means for generating a coded indication of that audible frequency form data element which it is desired to retrieve, means for exclusively reading out the coded forms of said data elements in rapid succession at a first predetermined speed, means for comparing the coded forms as read out with said coded indication and for generating a signal upon correspondence, and means responsive to said signal for terminating the exclusive reading of said coded forms and for reading out at a second predetermined speed the audible frequency form adjacent to the last read coded form.

13. Apparatus for retrieving from storage any one of a plurality of prerecorded audible messages, comprising, (a) a storage medium on which each message is recorded in both a coded form which can be read out in a first time duration and an audible frequency form which requires a time duration longer than said first time duration for audible reproduction, with said audible frequency form and the associated coded form having positions on said storage medium which have a predetermined relation, (b) means for generating a first electrical signal representing the coded form of that audible message which it is desired to retrieve, (c) means for exclusively reading out from said storage medium said coded forms of said messages in rapid succession at a first predetermined rate to provide in succession second electrical signals representing said coded forms and each having said first time duration, (d) means for comparing said first and second electrical signals for generating an output signal upon correspondence therebetween, and (e) means responsive to said output signal for reading out from said storage medium the audible frequency form associated with the last read coded form including means operating at a second predetermined rate to provide an audible reproduction of said audible frequency form which continues over said required longer time duration.

References Cited

UNITED STATES PATENTS

| | | | |
|---|---|---|---|
| 2,533,242 | 12/1950 | Gridley. | |
| 2,721,990 | 10/1955 | McNaney | 340—149 X |
| 2,771,595 | 11/1956 | Hendrickson. | |
| 2,894,255 | 7/1959 | Murphy | 340—347 |
| 2,897,399 | 7/1959 | Garwin et al. | 340—173 X |
| 3,059,064 | 10/1962 | Lebell | 179—100.3 |

BERNARD KONICK, *Primary Examiner.*

TERRELL W. FEARS, IRVING L. SRAGOW, *Examiners.*

J. P. SCHERLACHER, *Assistant Examiner.*